United States Patent [19]
Sakaguchi

[11] Patent Number: 5,511,237
[45] Date of Patent: Apr. 23, 1996

[54] DIGITAL PORTABLE TELEPHONE APPARATUS WITH HOLDING FUNCTION AND HOLDING TONE TRANSMISSION METHOD THEREFOR

[75] Inventor: Ikuo Sakaguchi, Tokyo, Japan

[73] Assignee: NEC Corporation, Japan

[21] Appl. No.: 273,834

[22] Filed: Jul. 12, 1994

[30] Foreign Application Priority Data

Jul. 13, 1993 [JP] Japan .................... 5-172838

[51] Int. Cl.$^6$ .................................. H04B 1/38
[52] U.S. Cl. .................. 455/79; 455/89; 379/63
[58] Field of Search .................. 455/79, 89, 116, 455/343, 54.1; 379/58, 59, 63

[56] References Cited

U.S. PATENT DOCUMENTS 5,008,954  4/1991  Oppendahl .................... 455/79
5,327,461  7/1994  Kushige ........................ 455/79

OTHER PUBLICATIONS

"Digital Cellular Telecommunication System, RCR Standard, RCR STD-27B", Research & Development Center for Radio Systems, Apr. 30, 1991, pp. 99-101.

Primary Examiner—Andrew I. Faile
Attorney, Agent, or Firm—Ostrolenk, Faber, Gerb & Soffen

[57] ABSTRACT

A digital portable telephone apparatus with a holding function normally has a VOX function and previously notifies, when absence of sound is detected in a sound presence condition, transmission power off of the talking channel by way of a postamble signal. The postamble signal is sent out periodically during a sound absence period and includes mobile station background noise generation information. Holding tone data which are the same data in successive sound sampling times are incorporated into the background noise generation information, and a resulted signal is transmitted. Accordingly, the transmission time of holding tone may be intermittent, and the transmission power can be saved.

5 Claims, 4 Drawing Sheets

Tn: SOUND SAMPLING TIME

Tn: SOUND SAMPLING TIME

DIGITAL PORTABLE TELEPHONE APPARATUS WITH HOLDING FUNCTION AND HOLDING TONE TRANSMISSION METHOD THEREFOR

BACKGROUND OF THE INVENTION

1. Field of the Invention

This invention relates to a mobile telephone system, and more particularly to a digital portable telephone apparatus with a holding function and a VOX function and a method for transmitting a holding tone of the apparatus.

2. Description of the Related Art

FIG. 1 is a block diagram showing the construction of a conventional example of a digital portable telephone apparatus which realizes a holding condition of speech.

Key inputting section 1 is used for a speaker to depress operation keys to input a destination number or various function inputs. Microphone 3 converts the inputted sound into sound signal Sv, and ascending sound signal processing section 4 converts sound signal Sv into sound data TX. Transmission section 6 generates transmission signal STX from inputted sound data TX, and antenna 7 radiates transmission signal STX. Meanwhile, reception section 10 converts reception signal RTX inputted thereto by way of antenna 7 into sound data RX, and descending sound signal processing section 8 converts sound data RX into sound signal Sv. Loudspeaker 9 converts inputted sound signal Sv into sound and outputs the sound. Holding tone generation section 11 generates holding tone data Sk upon holding, and change-over switch 12 changes ascending and descending sound signals Sv for holding tone data Sk and vice versa. Control section 2 controls the components described above.

Next, operation of the conventional example of FIG. 1 is described. Upon ordinary conversation, sound signal Sv from microphone 3 is converted into sound data TX by ascending sound signal processing section 4 and transmitted as transmission signal STX from antenna 7 by way of transmission section 6. Meanwhile, reception signal RTX fetched by antenna 7 is sent to and converted by reception section 10 into sound data RX. Sound data RX are converted into sound signal Sv by descending sound signal processing section 8 and outputted by way of loudspeaker 9.

On the other hand, in a holding condition, the speaker makes change-over switch 12 to change over from the output of microphone 3 to the output of holding tone generation section 11. Consequently, holding tone data Sk successively pass ascending sound signal processing section 4 and transmission section 6 and are transmitted from antenna 7. Simultaneously, descending sound signal Sv is changed over to the output of holding tone generation section 11 by change-over switch 12, so that descending holding tone is outputted from loudspeaker 9.

FIG. 2 illustrates timings at which control section 2 controls ascending sound signal processing section 4 and transmission section 6 to change over from holding tone data Sk, which is an audio signal, to ascending sound data TX. In particular, for every sound sampling time Tn (n=1, 2, 3, . . . ) of a fixed duration, holding tone data Sk is sampled and converted into sound data TXn (n=1, 2, 3, . . . ) by ascending sound signal processing section 4. Each two same sound data thereof are interleaved and successively sent out as ascending sound data Tx to transmission section 6. Transmission section 6 generates transmission signal STX from ascending sound data TX and transmits transmission signal STX.

In the digital portable telephone apparatus of the conventional example described above, in a holding condition, holding tone data Sk is successively converted into ascending sound data TX for each sound sampling time and continuously transmitted. Therefore, even if holding tone data Sk is same over a plurality of sound sampling times, every holding tone data Sk is successively converted into ascending sound data TX and continuously transmitted. Accordingly, it is difficult to reduce the transmission time upon holding and reduce the power dissipation.

SUMMARY OF THE INVENTION

It is an object of the present invention to provide a digital portable telephone apparatus with a holding function which reduces the power dissipation by reducing the transmission time of holding tone in a speech holding condition and a holding tone transmission method therefor.

A digital portable telephone apparatus with a holding function of the present first invention comprises a microphone for converting sound of a speaker into an ascending sound signal, an ascending sound signal processing section for converting the ascending sound signal into ascending sound data, a transmission section for sending out the ascending sound data as a transmission signal, a holding tone data storage section for holding in advance holding data including holding tone data of the same sound over a plurality of successive sound sampling times and a holding tone successive repeat number indicative of the number of a plurality of successive sound sampling times over which the holding tone data successively appear, an antenna for sending out the transmission signal and receiving a reception signal, a reception section for converting the received reception signal into descending sound data, a descending sound signal processing section for converting the descending sound data into a descending sound signal, a loudspeaker for converting the descending sound signal into sound and outputting the sound, and a control section for controlling the components described above.

The control section has a VOX function and stops, upon holding, operation of said ascending sound signal processing section, reads out the holding data from said holding data storage section, transmits the holding tone data adding a mobile station control signal thereto at one sound sampling time and further the mobile station control signals for successive sound sampling times less than the holding tone successive repeat number by one (1) following the holding tone data, as the transmission signal to said transmission section, simultaneously sends the holding tone data corresponding to the holding tone successive repeat number to said descending sound signal processing section so that the holding tone data are converted into a holding tone signal, and outputs holding tone from said loudspeaker.

A digital portable telephone apparatus with a holding function of the present second invention has the same construction as the first invention. However, it differs from the first invention in that the control section has a VOX function and stops, upon holding, operation of said ascending sound signal processing section, reads out the holding data from said holding data storage section, incorporates the holding tone data into each of postamble signals to be used for VOX control, transmits the postamble signal adding three (3) mobile station control signals thereto and further the mobile station control signals for successive sound sampling times less than holding tone successive repeat number by three (3) following the postamble signal, as the transmission signal to said transmission section, simultaneously sends the holding tone data corresponding to the holding tone successive repeat number to said descending sound signal processing section so that the holding tone data are converted into a holding tone signal, and outputs holding tone from said loudspeaker.

A holding tone transmission method of the present invention for a digital portable telephone apparatus with a holding function, comprising the steps, by a control section having a VOX function, of: stopping, when holding key depression information is inputted during speech, operation of an ascending sound signal processing section to stop inputting of sound from a microphone; reading out, from a holding tone data storage section, holding data held in said holding tone data storage section in advance and including holding tone data of the same sound over a plurality of successive sound sampling times and a holding tone successive repeat number indicative of the number of a plurality of successive sound sampling times over which the holding tone data successively appear;

incorporating the holding tone data into a postamble signal to be used for VOX control, transmitting the postamble signal adding three (3) mobile station control signals thereto and further the mobile station control signals for successive sound sampling times less than the holding tone successive repeat number by three (3) following the postamble signal as a transmission signal from a transmission section; successively sending out, in the meantime, the holding tone data corresponding to the holding tone successive repeat number to a descending sound signal processing section so that the holding tone data are converted into a holding tone signal and outputting the holding tone signal as holding tone from a loudspeaker; repeating the series of steps described above during the holding period; and canceling the stopping of said ascending sound signal processing section in response to an end of the holding period.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENT

An ordinary portable telephone apparatus has a VOX function. The VOX function denotes a function of a mobile station which turns, during communication, the transmission output of the transmission channel on or off in response to presence or absence of sound. Further, the mobile station outputs, during the sound absence period, mobile station control signal TC including a synchronizing signal and other control information for each sound sampling time.

Then, by utilizing the VOX function, the invention is possible to reduce the transmission time upon holding and save the power dissipation.

Next, embodiments of the present invention are described with reference to the drawings.

Figure 1:
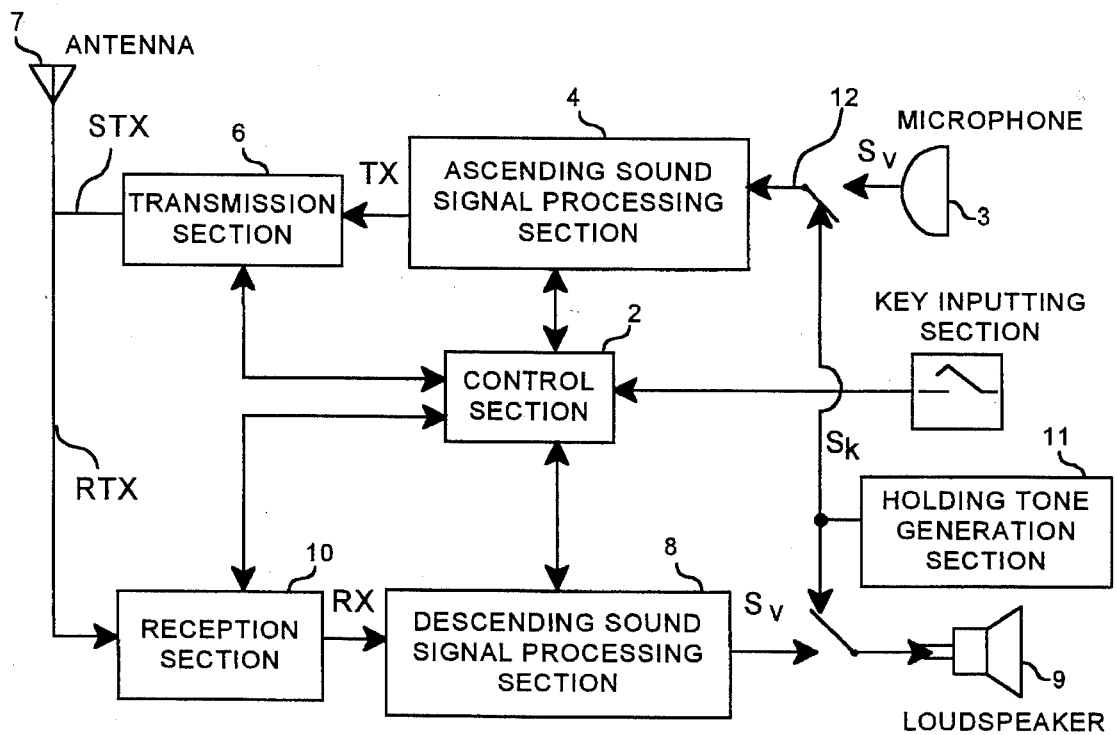
FIG. 1 is a block diagram showing the construction of a conventional example of a digital portable telephone apparatus with a holding function.
Figure 2:
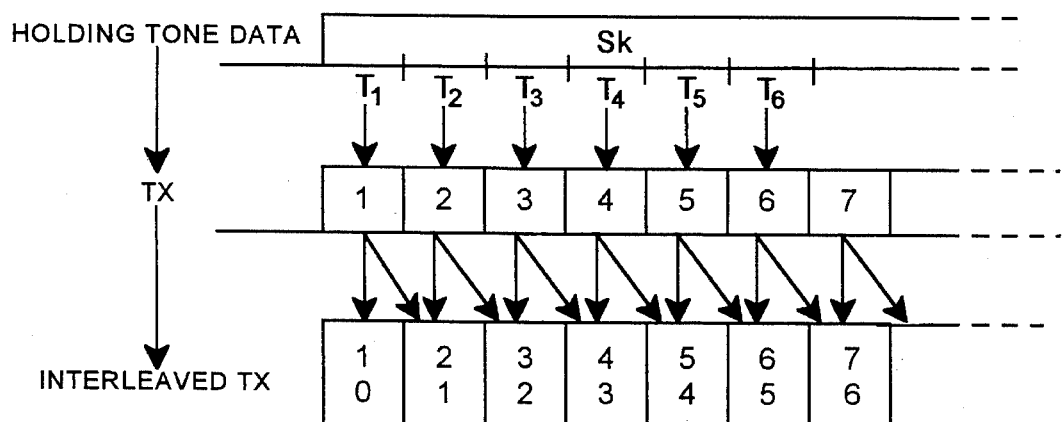
FIG. 2 is a diagram illustrating timings at which the control section of the conventional example of FIG. 1 converts holding tone into ascending sound data.
Figure 3:
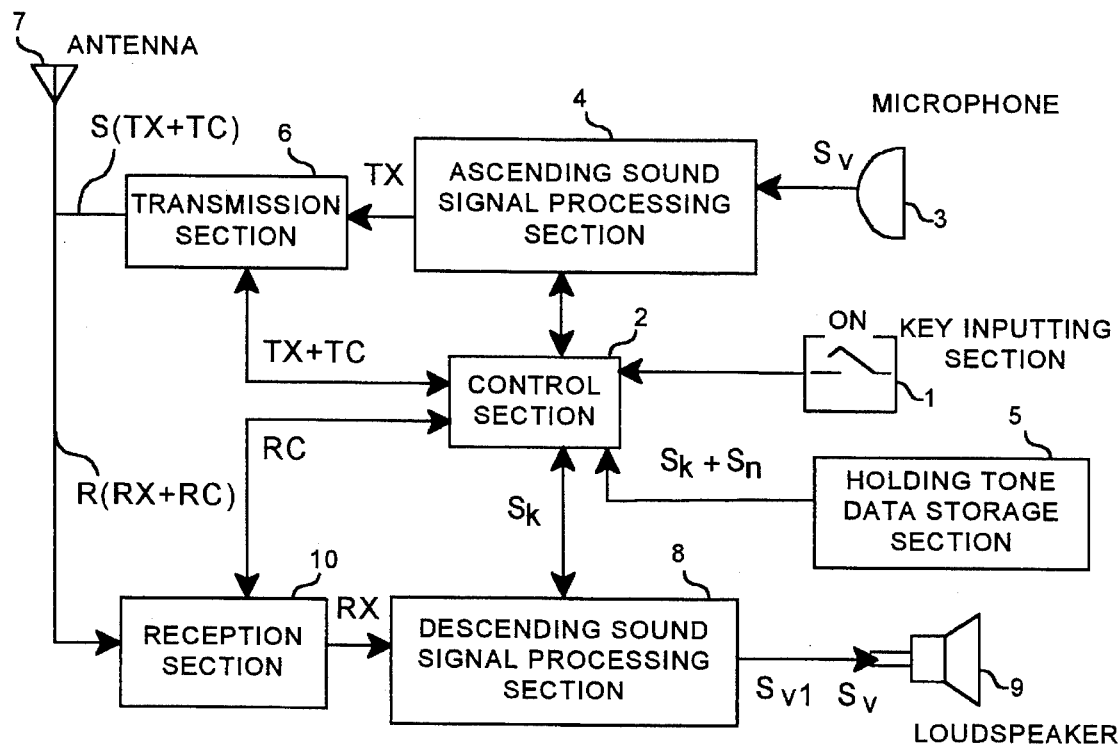
FIG. 3 is a block diagram showing the construction of a first embodiment of a digital portable telephone apparatus with a holding function as well as a second embodiment of the same of the present invention.

FIG. 3 is a block diagram showing the construction of a first embodiment of the digital portable telephone apparatus with a holding function having a VOX function of the present invention, and similar elements to those in the construction of the conventional example shown in FIG. 1 are denoted by the same reference numerals. The present embodiment is different from the conventional example in that change-over switch 12 is omitted and microphone 3 and loudspeaker 9 are connected directly to ascending sound signal processing section 4 and descending sound signal processing section 8, respectively. Further, holding tone data storage section 5 is provided in place of holding tone generation section 11 of the conventional example. Holding tone data storage section 5 holds in advance holding tone data Sk which are devised so as to make same data within successive sound sampling times and number Sn of the sound sampling times over which same holding tone data Sk continues (hereinafter number Sn is referred to as holding tone successive repeat number). The other components of the present embodiment are similar to those of the conventional example, and overlapping description thereof is omitted herein.

Next, operation of the present embodiment upon holding is described with reference to FIG. 3 and the timing chart of FIG. 4.

Figure 4:
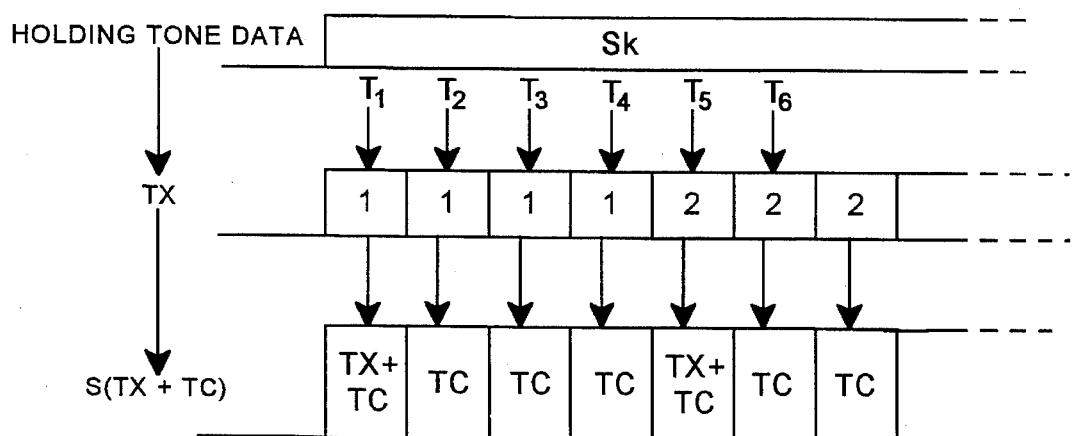
FIG. 4 is a diagram illustrating timings at which the control section of the first embodiment sends out holding tone data utilizing the VOX function.

Upon holding, control section 2 of the digital portable telephone apparatus stops ascending sound signal processing section 4 and, as shown in FIG. 4, reads out holding tone data Sk and holding tone successive repeat number Sn (Sn=4 in FIG. 4), both Sk and Sn being stored in advance in holding tone data storage section 5 of the telephone apparatus. Then, control section 2 transmits the holding tone data TX corresponding to Sk with mobile station control signal TC added thereto as a preceding transmission signal and, following the preceding transmission signal, mobile station control signal TC successively three (3) times (Sn−1=3) to transmission section 6 and the transmission signal is sent out via antenna 7. Thus, the transmission time of the holding tone signal is reduced by the VOX function since the holding tone signal is sent out at only one sound sampling time within successive Sn sound sampling times. Simultaneously, control section 2 sends the holding tone data corresponding to the holding tone successive repeat number to said descending sound signal processing section so that the holding tone data are converted into a holding tone signal, and outputs holding tone from said loudspeaker. This cycle of operation is repeated during holding.

A second embodiment of the digital portable telephone apparatus with a holding function has the same construction as that of the first embodiment and it is in accordance with the domestic standard of Japan "RCR Standard for Digital Cellular Telecommunication, RCR STD-27B", issued Apr. 30, 1991 and revised Jan. 30, 1992 and Dec. 10, 1992.

In the standard RCR STD-27B, the postamble signal is a signal which previously notifies transmission power off of a talking channel when absence of sound is detected in a sound presence condition. If absence of sound is detected while the mobile station during communication is in a sound presence condition, then transmission power off of the talking channel is notified previously by way of postamble signal POST, or if presence of sound is detected while the mobile station is in a sound absence condition, then transmission power on of the talking channel is notified previously by way of preamble signal PRE. In order to allow generation of background noise on the base station side during a sound absence period, postamble signal POST includes information of mobile station background noise. Background noise generation information of postamble signal POST is a coded signal obtained by coding the mobile station background noise in accordance with ordinary sound coding rules. The mobile station periodically transmits postamble signal POST during the sound absence period so that updating of background noise is allowed on the base station side.

The operation of the second embodiment is different from that of the first embodiment and will be explained hereafter with reference to the timing chart of FIG. 5 and the flow chart of FIG. 6 which represents the operation of the second embodiment according to the holding tone transmission method of the invention.

Now, if holding key depression information is transmitted during speech from key inputting section 1 to control section 2 (S1), control section 2 stops operation of ascending sound signal processing section 4 in order to stop inputting of sound from microphone 3 (S2).

Figure 5:
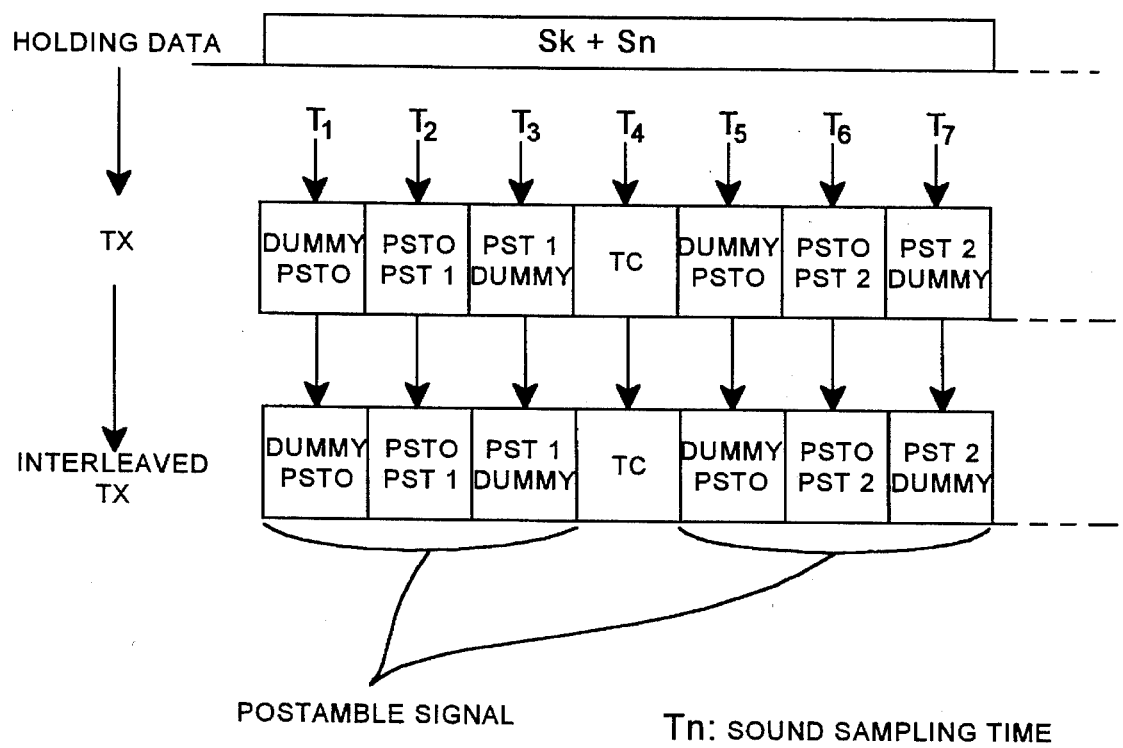
FIG. 5 is a diagram illustrating timings at which the control section of the second embodiment sends out holding tone data utilizing the VOX function.
Figure 6:
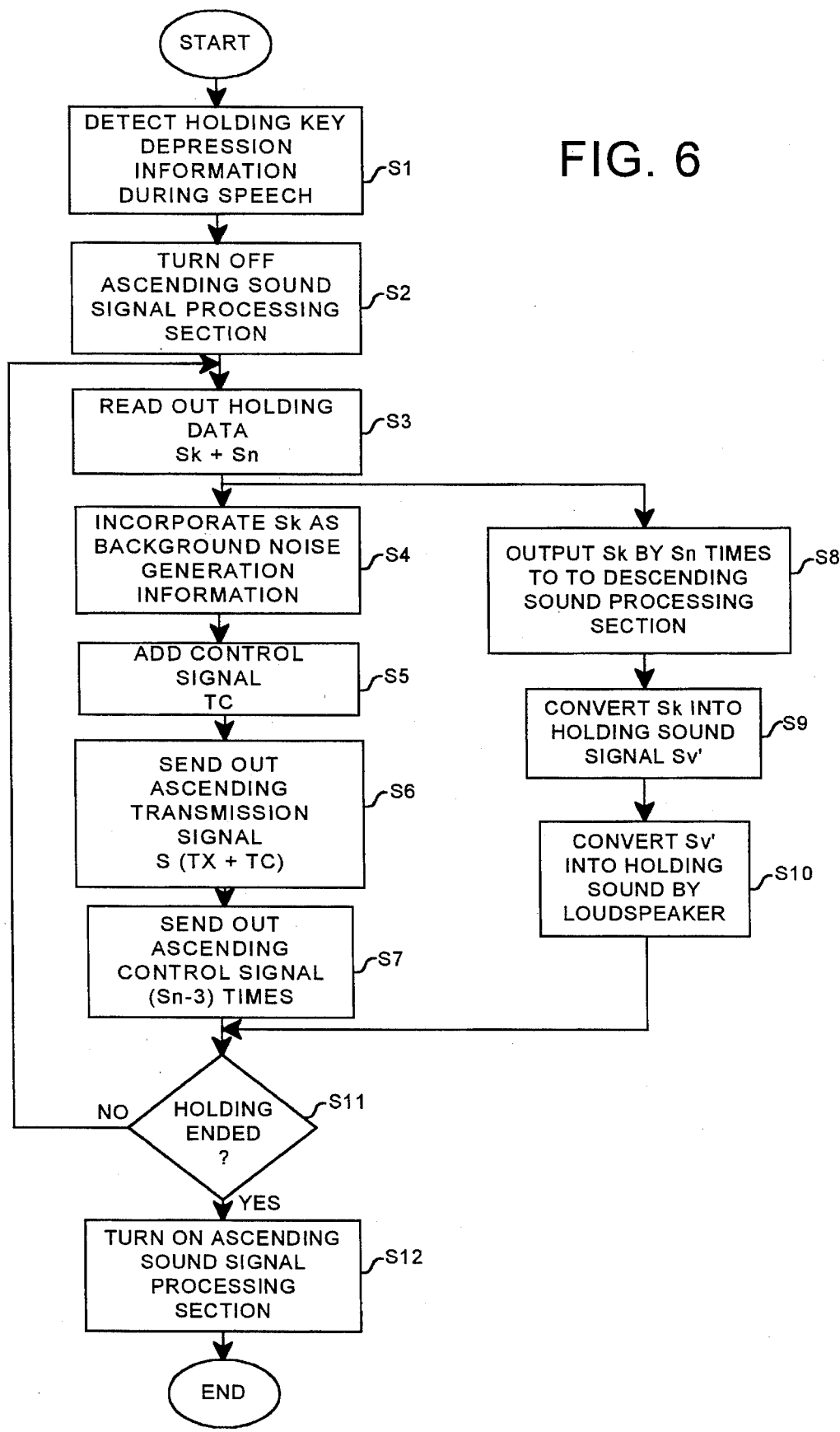
FIG. 6 is a flow chart of the operation according to an embodiment of a holding tone transmission method of the present invention.

Thereafter, control section 2 reads out holding data Sk+Sn comprised of holding tone data Sk and holding tone successive repeat number Sn (Sn=4 in the example of FIG. 5) from holding tone storage section 5 in sound sampling time T1 as seen from FIG. 5 (S3), and incorporates holding tone data Sk as mobile station background noise generation information PST1 in postamble signal POST for previously notifying transmission power off of the talking channel (S4). In postamble signal POST, dummy, unique word 224 bits PST0 and background noise generation information PST1 are processed by interleaving over sound sampling times T1 to T3 to form ascending sound data TX.

Thereafter, control section 2 sends sound data TX with ascending control signal TC added thereto for each slot to transmission section 6 (S5) and further sends it out as ascending transmission signal S(TX+TC) by way of antenna 7 (S6). In the following sound sampling time T4, only one ascending control signal TC is transmitted to transmission section 6 to be sent out via antenna 7 since Sn−3=1 in this case (S7), thereby the first cycle is ended.

On the other hand, control section 2 repetitively sends out, in parallel to the transmission operation described above, holding tone data Sk by the number corresponding to holding tone successive repeat number Sn (Sn=4 in the example) of holding data Sk+Sn read out at step S3 to descending sound signal processing section 8 (S8). Descending signal processing section 8 converts holding tone data Sk inputted thereto into holding tone signal Sv' (S9), and loudspeaker 9 converts holding tone signal Sv' into holding tone and outputs the holding tone (S10), thereby ending the first cycle as well.

Further, control section 2 starts a second cycle of the same transmission operation and holding tone outputting operation again at sound sampling time T5, and thereafter repeats the same operation until after the holding operation comes to an end (S11). After the holding operation comes to an end, the stopping of ascending sound signal processing section 4 is canceled (S12), thereby ending the processing.

On the other hand, reception signal R(RX+RC) by way of antenna 7 during holding operation is separated into descending sound data RX and descending control signal RC by reception section 10, and descending sound data RX are abandoned while descending control signal RC is transmitted to control section 2.

As described above, according to the present embodiments, since holding data including holding tone data Sk and holding tone successive repeat number Sn are held in the holding tone data storage section and, upon holding, holding data Sk+Sn are read out and holding tone data Sk is transmitted intermittently, there is an advantage in that the transmission time of holding tone can be reduced and the power dissipation can be saved.

In the above description, Sn was presumed to be four (4) for both embodiments and to coincide with the cycle of the postamble signal for the second embodiment. However, Sn can be other value larger than two (2) for the first embodiment, or larger than four (4) and below the cycle of the postamble signal for the second embodiment.

What is claimed is:

1. A digital portable telephone apparatus with a holding function, comprising:

a microphone for converting sound of a speaker into an ascending sound signal;

an ascending sound signal processing section for converting the ascending sound signal into ascending sound data;

a transmission section for sending out the ascending sound data as a transmission signal;

a holding tone data storage section for holding in advance holding data including holding tone data to be repeated over a plurality of successive sound sampling times and a holding tone successive repeat number indicative of the number of a plurality of successive sound sampling times over which the holding tone data successively appear;

an antenna for sending out the transmission signal and receiving a reception signal;

a reception section for converting the received reception signal into descending sound data;

a descending sound signal processing section for converting the descending sound data into a descending sound signal;

a loudspeaker for converting the descending sound signal into sound and outputting the sound; and a control section having a VOX function which stops, upon holding, operation of said ascending sound signal processing section, reads out the holding tone data from said holding tone data storage section, transmits to the transmission section the holding tone data with a mobile station control signal added thereto at one of the plurality of successive sound sampling times and, after transmitting the holding tone data with the mobile station control signal, transmits to the transmission section the mobile station control signal for a number of the successive sound sampling times equal to the holding tone successive repeat number less one (1), and simultaneously sends the holding tone data corresponding to the holding tone successive repeat number to said descending sound signal processing section so that the holding tone data are converted into a holding tone signal, and outputs the holding tone signal from said loudspeaker.

2. A digital portable telephone apparatus with a holding function, comprising:

a microphone for converting sound of a speaker into an ascending sound signal;

an ascending sound signal processing section for converting the ascending sound signal into ascending sound data;

a transmission section for sending out the ascending sound data as a transmission signal;

a holding tone data storage section for holding in advance holding data including holding tone data to be repeated over a plurality of successive sound sampling times and a holding tone successive repeat number indicative of the number of a plurality of successive sound sampling times over which the holding tone data successively appear;

an antenna for sending out the transmission signal and receiving a reception signal;

a reception section for converting the received reception signal into descending sound data;

a descending sound signal processing section for converting the descending sound data into a descending sound signal;

a loudspeaker for converting the descending sound signal into sound and outputting the sound; and a control section having a VOX function which stops, upon holding, operation of said ascending sound signal processing section, reads out the holding tone data from said holding tone data storage section, incorporates the holding tone data into each of postamble signals to be used for VOX control over three of the plurality of successive sound sampling times, transmits to the transmission section the postamble signals with a mobile station control signal added thereto and, after transmission of the postamble signals with the mobile station control signal added thereto, transmits to the transmission section the mobile station control signal for a number of successive sound sampling times equal to the holding tone successive repeat number less three (3), and simultaneously sends the holding tone data corresponding to the holding tone successive repeat number to said descending sound signal processing section so that the holding tone data are converted into a holding tone signal, and outputs the holding tone signal from said loudspeaker.

3. A digital portable telephone apparatus with a holding function as claimed in claim 2, wherein the postamble signal is a signal which previously notifies a stopping of radio signals of a talking channel when absence of sound is detected in a sound presence condition, and the holding tone data are incorporated into the postamble signal as mobile station background noise information to be included into the postamble signal.

4. A holding tone transmission method for a digital portable telephone apparatus with a holding function, comprising the steps, by a control section having a VOX function, of:

a) stopping, when holding key depression information is inputted during speech, operation of an ascending sound signal processing section to stop inputting of sound from a microphone;

b) reading out, from a holding tone data storage section, holding data held in said holding tone data storage section in advance and including holding tone data to be repeated over a plurality of successive sound sampling times and a holding tone successive repeat number indicative of the number of a plurality of successive sound sampling times over which the holding tone data successively appear;

c) incorporating the holding tone data into a postamble signal to be used for VOX control over three of the plurality of successive time periods, transmitting to a transmitting section the postamble signals with a mobile station control signal added thereto and, after transmission of the postamble signals with the mobile station control signal added thereto, transmitting to the transmission section the mobile station control signal for successive sound sampling times equal to the holding tone successive repeat number less three (3);

d) successively sending out, in the meantime, the holding tone data corresponding to the holding tone successive repeat number to a descending sound signal processing section so that the holding tone data are converted into a holding tone signal and outputting the holding tone signal from a loudspeaker;

repeating steps a–d above during subsequent holding periods; and canceling the stopping of said ascending sound signal processing section in response to an end of the holding period.

5. A holding tone transmission method for a digital portable telephone apparatus with a holding function as claimed in claim 4, wherein the postamble signal is a signal which previously notifies a stopping of radio signals of a talking channel when absence of sound is detected in a sound presence condition, and the holding tone data are incorporated into the postamble signal as mobile station background noise information to be included into the postamble signal.

* * * * *